A. CONDY.
KITCHEN UTENSIL FOR BROILING AND TOASTING FOOD.
APPLICATION FILED MAR. 25, 1921.

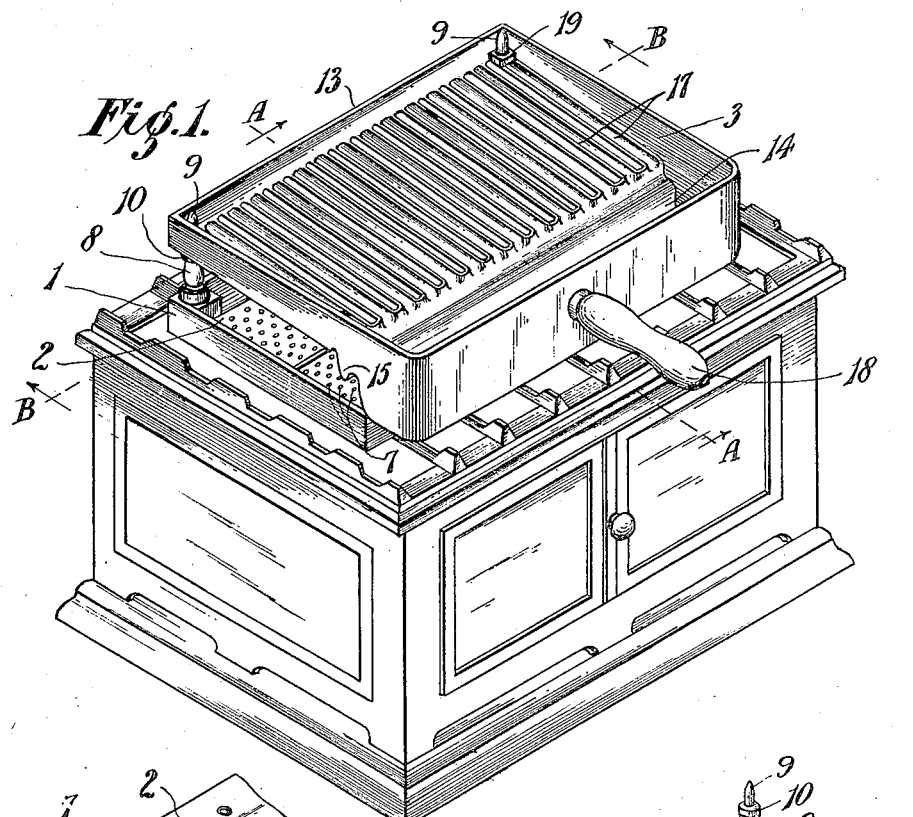
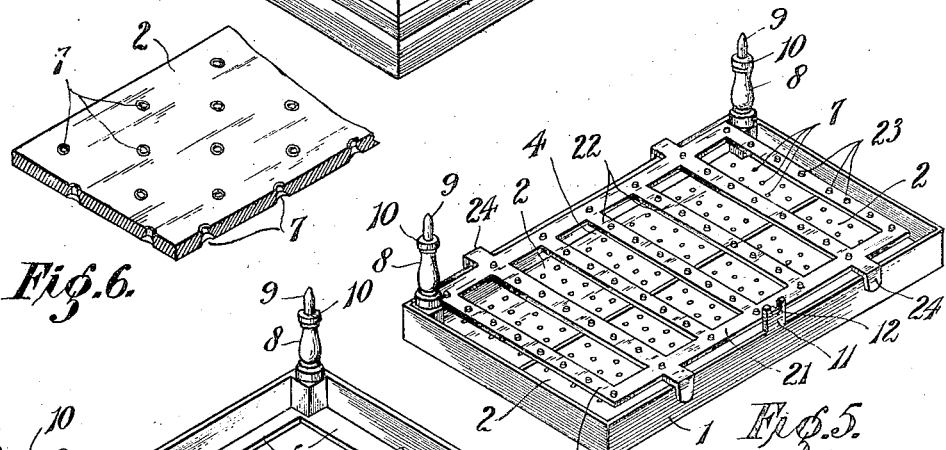
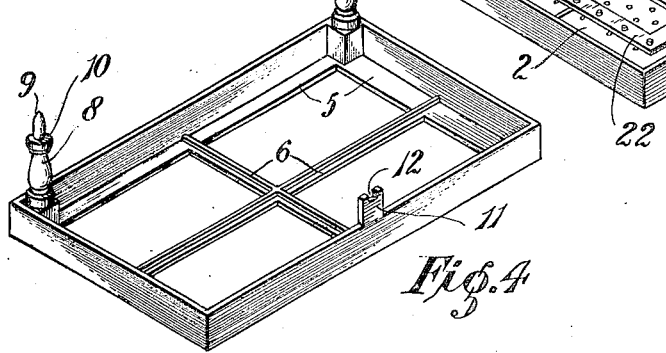

1,422,835.

Patented July 18, 1922.
2 SHEETS—SHEET 2.

UNITED STATES PATENT OFFICE.

ALICE CONDY, OF ASHFIELD, NEAR SYDNEY, NEW SOUTH WALES, AUSTRALIA, ASSIGNOR TO JOHN EDWARD BOLGER, OF SYDNEY, NEW SOUTH WALES, AUSTRALIA.

KITCHEN UTENSIL FOR BROILING AND TOASTING FOOD.

1,422,835.             Specification of Letters Patent.        Patented July 18, 1922.

Application filed March 25, 1921. Serial No. 455,431.

*To all whom it may concern:*

Be it known that I, ALICE CONDY, a subject of the King of Great Britain, residing at Ashfield, near Sydney, in the State of New South Wales, Commonwealth of Australia, have invented new and useful Improvements in Kitchen Utensils for Broiling and Toasting Food, of which the following is a specification.

This invention relates to an improved portable kitchen utensil which will be found particularly useful in broiling and in toasting operations.

The primary object of the invention is to provide a kitchen utensil having means for the utilization of radiant heat in its cooking operations, and means whereby the utensil is readily convertible for use as a broiler or as a toaster.

A further object of the invention is to provide a utensil having a framing to support blocks or sheets to be heated and to radiate heat, and a detachable broiler of improved construction wherein the parallel grid bars have grooves for the collection of gravy or other liquid exuded from the food, and a trough adapted to accommodate food articles and to receive the liquid discharged from the grooves of the grid-bars.

A still further object of the invention is to provide means whereby gravy or other liquid collected by the grid bars and which may overflow the grooves is prevented from fouling the utensil frame, and is caused to drip from predetermined points onto the heated blocks or sheets and be consumed, thereby aiding in the broiling of the food supported by the grid bars.

With these and other objects in view the invention consists of the features of construction, combination and arrangement hereinafter fully described, reference being had to the accompanying drawings wherein :—

Figure 1 is a perspective view illustrating the improved utensil employed as a broiler and supported upon a cooking stove.

Figure 4 is a perspective view of the base frame which supports blocks or sheets to be heated and radiate heat.

Figure 5 is a perspective view of the utensil converted for use as a toaster.

Figure 6 is an enlarged sectional view illustrating portion of a heat radiating block or sheet.

Figure 2:
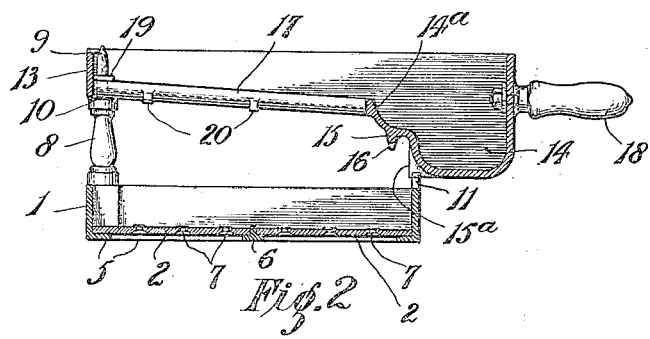
Figure 2 is a transverse section on the line A—A Figure 1.
Figure 3:
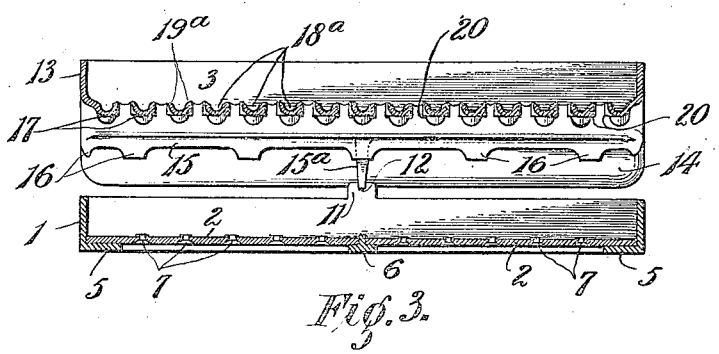
Figure 3 is a longitudinal section on the line B—B Figure 1.
Figure 7:
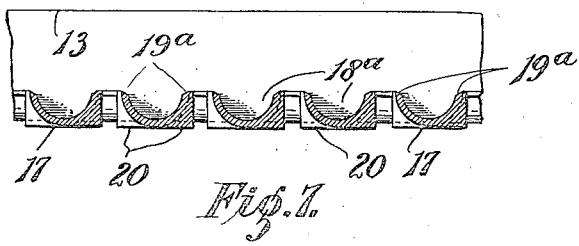
Figure 7 is a sectional detail on an enlarged scale of the grid-bars.

In cooking food substances by the aid of gas, oil or vapour burners, it is desirable that the fuel should not be permitted to contact with the goods, otherwise the flavor will be adversely affected. With this in view, I provide a base frame 1 in which heat radiating blocks or sheets 2 are supported, and broiler and toaster devices 3, and 4, respectively, adapted for attachment to said frame.

The base frame is constructed preferably of metal and of rectangular design, having inwardly projecting flanges 5 and bars 6, which form with the walls of said frame a supporting means for detachable and closely fitting blocks or sheets 2 having a series of regularly spaced orifices 7.

Said blocks or sheets are of a material possessing good heat conductivity, and are so arranged in said frame 1 as to direct radiant heat to food articles which are supported directly thereabove for toasting or broiling purposes.

Moulded blocks or sheets of fire-clay may be employed with my invention, but from experiments I have made, I ascertained that the use of sheets of annealed steel of suitable gauge is preferable, owing to their greater durability and being capable of production in an accurate and economic manner by the use of dies in metal stamping operations.

The orifices 7 are countersunk on the underside and are burred slightly on the upper side of said sheets, and said metal sheets are provided with a coating of a suitable absorbent material such as kalsomine, for the purposes hereinafter explained.

The base frame 1 supporting the perforated metal sheets 2 is adapted to be placed over and supported by a gas-range, oil stove or other heating medium, whereby said sheets become quickly heated to a high temperature and give off radiant heat.

The countersunk orifices 7 of said sheets 2 function as heat collecting chambers wherefrom heat is distributed in regular lines convectively. Said sheets are by this means quickly raised to a high and an approximately uniform surface temperature.

The kalsomine coating applied to said sheets 2 and the burrs around the orifices 7 prevents the spreading and arrests the flow of any liquid which may gravitate from the foods to said sheets.

The base frame 1 rigidly supports at its rear corners short metal pillars 8 having spiked or tapered upper ends 9 and collars 10, and an upwardly projecting bracket 11 having a seating recess 12 is formed on the front wall of said frame.

The broiler 3 is adapted for ready attachment to said base frame 1, and it comprises a frame 13, a longitudinally disposed and integrally formed catchment trough 14, a stop bar 15 with drip projections 16 formed on the underside of said trough, inclined grid-bars 17 of peculiar construction (hereinafter fully described) and a handle 18.

Apertured bosses 19 are formed at the two rear corners of the broiler frame 13 to receive the spiked upper ends 9 and rest upon the collars 10 of the pillars 8 of the base frame 1. A lug 15$^a$ is formed centrally on the underside of the catchment trough 14 and is adapted to fit into the recessed bracket 11, whereby the front end of the broiler attachment is detachably but firmly supported in correct location over said base frame.

The grid-bars 17 are integral with the rear wall of the frame 13 and with the curved inner wall 14$^a$ of the trough 14, and they are constructed with a downward inclination towards said catchment trough 14. Said grid-bars are preferably of semi-circular shape in cross-section and they are constructed with deep grooves 18$^a$ having tapering upper edges 19$^a$. Grid-bars of the construction described collect gravy or other liquid exuded from the food being broiled and automatically deliver it to the trough 14 located at the front ends thereof.

When the broiler 3 is attached to the base frame 1 it is preferred that the trough 14 should extend forwardly beyond the front wall of said frame, as illustrated, in order to provide a maximum broiling area in relation to the heat radiating sheets 2. The trough 14 is of such design, location and arrangement that food substances as, for example, bacon rashers, tomatoes or sliced potatoes, are accommodated thereby and cooked or partially cooked by and in the hot liquid collected and delivered by the grid-bars 17, simultaneously with the broiling of meats or other foods supported by said grid-bars over the heating sheets 2.

The tapered formation of the grooved grid-bars 17 provides supporting points for foods being broiled, and also tends to deliver liquid from the food into the grooves 18$^a$.

The inclination given to the grooved grid-bars is very slight, sufficient only to ensure that the hot collected liquid will flow to the trough 14. The disadvantage of unevenness in cooking, which would result from the use of extraneous adjustment devices to tilt the broiler attachment or its grid-bars, is thereby obviated.

It is the practice of chefs, when broiling meats, to occasionally squeeze the food with a tongs to exude liquid which, by gravitating to the fuel, causes a flare to impart a slightly burnt and desired flavor to the food.

On some occasions, liquid exuded from the food and collected by the grid-bars of the utensil will overflow the grooves 18$^a$ and trickle on the rounded under surfaces of the grid-bars. It has been found necessary to collect such overflow of liquid, arrest its flow to obviate fouling of the utensil, and direct it to the heated plate 2 at predetermined points to be consumed and thereby aid in the broiling operations.

For these purposes, each of the grid-bars 17 is formed on its under surface with stop-pieces 20 in staggered arrangement. These stop-pieces are preferably V-shaped and the apices function as drip-points in correct relationship to the heated plates 2 disposed therebeneath.

As an additional safeguard against fouling of the utensil by liquid overflow from the grooved grid-bars, I provide on the underside of the trough 14 at its inner end a longitudinal stop bar 15, having downward projections 16.

The provision of the stop-pieces 20 on the grooved grid-bars 17 and the stop-bar 15 disposed at right angles to said bars in the manner illustrated by the drawings provides an effective safeguard against fouling of the utensil due to the overflow and escape of fat or other liquid under all conditions.

Owing to the grooves 18$^a$ of the grid-bars 17 being in the form of troughs, it will be obvious that they can be readily and conveniently cleansed.

The toaster attachment is of simple construction comprising a frame having longitudinal and transverse flat metal bars 21 and 22, respectively, provided with a series of upwardly projecting studs 23 of conical formation. These studs are adapted to support slices of bread and other articles clear above the bars of the toaster frame in order that the food is toasted uniformly and does not bear undesirable markings which would be caused if supported directly by said bars.

The longitudinal frame members 21 are furnished with hook projections 24 to engage with the walls of the base frame 1 when applied thereto in substitution for the removable broiler attachment 3.

What I do claim is:—

1. A kitchen utensil comprising an open base frame adapted to be supported over a fuel burner, a sheet of heat conducting and heat radiatng material mounted in said frame, said sheet having regularly spaced orifices, said orifices being countersunk on the underside and burred slightly on the upper side, a broiler device having grooved grid-bars, and a common catchment trough and means for the attachment of said broiler device to said base frame.

2. In a kitchen utensil, a broiler having grid bars provided with stop pieces to regulate the flow of fat and other ignitable juices exuded from the food under heat and to cause the same to drop at predetermined points, a base to support the broiler, and a heat conducting plate in the base and spaced below the broiler, to catch the fat which falls therefrom, said plate having openings arranged out of vertical alignment with the stop pieces, and also having a covering of absorbent material on its upper side.

In testimony whereof I affix my signature in presence of two witnesses.

ALICE CONDY.

Witnesses:
  A. J. CALLINAN,
  JAMES H. ANDERSON.